(12) United States Patent
Kommrusch et al.

(10) Patent No.: US 10,168,731 B2
(45) Date of Patent: Jan. 1, 2019

(54) MANAGING FREQUENCY CHANGES OF CLOCK SIGNALS ACROSS DIFFERENT CLOCK DOMAINS

(71) Applicant: Advanced Micro Devices, Inc., Sunnyvale, CA (US)

(72) Inventors: Steven Kommrusch, Fort Collins, CO (US); Amitabh Mehra, Fort Collins, CO (US); Richard Martin Born, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 209 days.

(21) Appl. No.: 15/209,521

(22) Filed: Jul. 13, 2016

(65) Prior Publication Data

US 2018/0017988 A1 Jan. 18, 2018

(51) Int. Cl.
| | | |
|---|---|---|
| G06F 1/26 | (2006.01) | |
| G06F 1/00 | (2006.01) | |
| G06F 1/32 | (2006.01) | |
| G06F 1/08 | (2006.01) | |
| G06F 13/14 | (2006.01) | |

(52) U.S. Cl.
CPC ............. G06F 1/08 (2013.01); G06F 1/3296 (2013.01); G06F 13/14 (2013.01); G06F 1/26 (2013.01)

(58) Field of Classification Search
CPC ..................................... G06F 1/32; G06F 1/26
See application file for complete search history.

(56) References Cited

U.S. PATENT DOCUMENTS

| | | | |
|---|---|---|---|
| 7,574,635 B1* | 8/2009 | Alfke ..................... | G11C 29/56 710/52 |
| 8,260,982 B2 | 9/2012 | Paulson et al. | |
| 8,433,875 B2 | 4/2013 | Cortadella et al. | |
| 9,449,127 B1* | 9/2016 | Mishra ................ | G06F 17/5031 |
| 2002/0029356 A1* | 3/2002 | Takahashi ................ | G06F 5/06 713/600 |
| 2005/0017753 A1* | 1/2005 | Clift ..................... | H03K 23/005 326/37 |
| 2005/0220239 A1* | 10/2005 | Sigurdsson ............... | H04L 7/02 375/372 |
| 2006/0190668 A1* | 8/2006 | Biran .................. | G06F 13/4059 710/315 |
| 2008/0290914 A1* | 11/2008 | Chard ...................... | G06F 1/12 327/146 |
| 2009/0319745 A1 | 12/2009 | LaBerge | |

(Continued)

OTHER PUBLICATIONS

International Search Report and Written Opinion dated Apr. 13, 2017 in PCT Application No. PCT/US2016/051813, 11 pages.

*Primary Examiner* — Phil K Nguyen (57) ABSTRACT

A processor maintains a minimum setup time for data being transferred between clock domains, including maintaining the minimum setup time in response to a frequency change in a clock signal for at least one of the clock domains. The processor employs one or more control modules that monitor clock edges in each of the clock domains to ensure that data is not accessed by the receiving clock domain from a storage location until a minimum number of phases have elapsed in the transferring clock domain after the data has been written to the storage location. Further, the control module maintains the minimum setup time in response to a change in clock frequency at one or both of the clock domains.

19 Claims, 4 Drawing Sheets

(56) References Cited

U.S. PATENT DOCUMENTS

2010/0111117 A1    5/2010  Kolinummi et al.
2013/0254583 A1    9/2013  Rifani et al.
2014/0203798 A1*   7/2014  O'Mahony ...... G01R 31/31726
                                                  324/76.82

* cited by examiner

MANAGING FREQUENCY CHANGES OF CLOCK SIGNALS ACROSS DIFFERENT CLOCK DOMAINS

BACKGROUND

A processor typically employs one or more clock signals to synchronize logic operations at modules of the processor, thereby preventing errors such as setup errors, race conditions, and the like. A typical processor employs different clock signals for different portions of the processor, wherein each processor portion is referred to as a clock domain. By employing different clock domains, the processor operates the different portions at different frequencies, and also operates the different portions relatively independently with respect to timing of the logic operations. For example, the processor can synchronize the different clock domains with clock signals of different frequencies, thereby improving processing efficiency. Further, the processor can provide different clock signals to different clock domains without synchronizing the different clock signals, thereby simplifying clock management and signal routing at the processor. However, when data is communicated across clock domains of the processor, meta-stability errors can arise. These errors can be ameliorated by including a meta-stability circuit, such set of flip-flops, between the clock domains to effectuate the data transfer. However, such meta-stability circuits can add latency, as well as require extra circuitry (such as extra entries of a buffer) to address control signal delays. The errors can also be reduced by employing a first-in first-out buffer (FIFO) to transfer data across clock domains, but conventional FIFOs can introduce errors in the data transfer when the clock frequency for one of the time domains is altered, either because of a voltage droop or because of a change in power mode of one or more of the clock domains.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-5 illustrate techniques for maintaining a minimum setup time for data being transferred between clock domains of a processor, including maintaining the minimum setup time in response to a frequency change in a clock signal for at least one of the clock domains. The processor employs one or more control modules that monitor clock edges in each of the clock domains to ensure that data is not read by the receiving clock domain from a storage location until a minimum number of phases have elapsed in the transferring clock domain after the data has been written to the storage location, thereby ensuring that the data has sufficient setup time to be accurately stored at the storage location, reducing data transfer errors. Further, the control module maintains the minimum setup time in response to a change in clock frequency at one or both of the clock domains, whether the change in clock frequency is the result of a change in power mode at one of the clock domains, the result of a voltage droop, or a combination thereof. By employing the one or more control modules to maintain the minimum setup time, the processor continues to accurately transfer data in response to clock frequency changes, and in particular without restarting the transfer process at either of the clock domains. The processor enhances processing efficiency and reduces power consumption while supporting accurate data transfer between the clock domains.

In some embodiments, the storage location employed by the processor to transfer data is a first-in first out queue (FIFO) having multiple entries. Each clock domain manages a set of pointers to access the FIFO, with the control module managing when each pointer value is adjusted and provided to the FIFO, thereby controlling when the FIFO is written and read. The control module thereby ensures that a minimum setup time is established for data written to the FIFO before that data is read. For example, in some embodiments the control module enforces a minimum setup time of one cycle (one complete period) of the "slower" clock signal of the two clock domains—that is, the clock signal of the two clock domains having the lower frequency. To enforce the minimum setup time, the control module tracks clock edges of the two clock signals and ensures that a read pointer to read a given storage location of the FIFO at the receiving clock domain is provided to the FIFO only when the minimum setup time has elapsed after supplying a write pointer to write the given storage location at the transferring clock domain. The enforcement of the minimum setup time sometimes requires the control module to selectively skip or omit reading from the FIFO for individual clock cycles of the receiving clock domain. As described further herein, by employing a control module to enforce the minimum setup time, the processor adjusts the frequency of a clock signal provided to at least one of the clock domains while maintaining the flow of data across the clock domains. In contrast, conventional clock domain synchronization circuits typically undergo a reset process in response to a change in clock frequency at one of the clock domains, thereby consuming additional power and reducing the speed and efficiency of data transfer.

Figure 1:
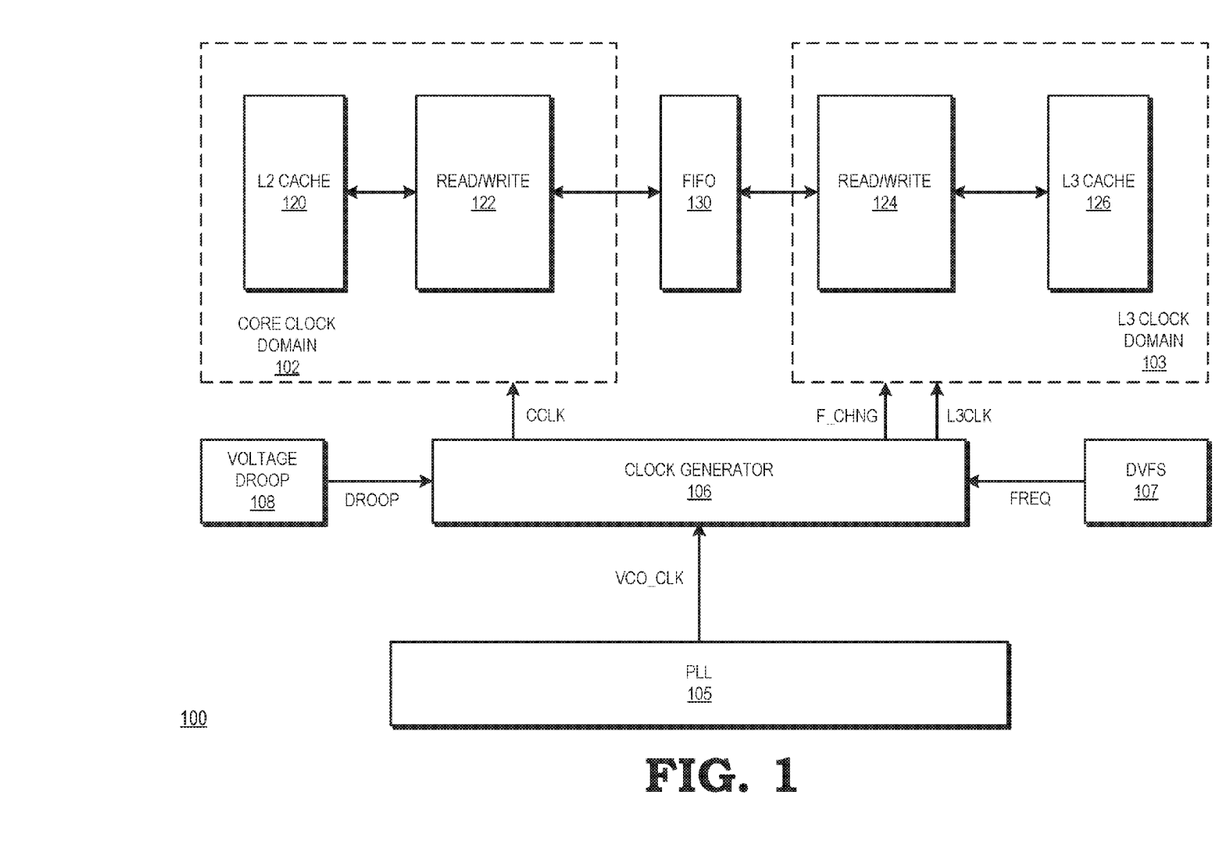
FIG. 1 is a block diagram of a processor that maintains a minimum setup time for a data transfer between clock domains in response to a change in clock frequency at one of the clock domains in accordance with some embodiments.

FIG. 1 illustrates a processor 100 that maintains a minimum setup time for storage of data being transferred between clock domains in accordance with some embodiments. The processor 100 is implemented by any of a variety of compute-enabled electronic devices, such as a server, a desktop computer, a notebook computer, a tablet computer, a compute-enabled portable cellular phone (e.g., a "smart phone"), a compute-enabled watch or other wearable item, a personal digital assistant (PDA), a gaming console, and the like. In the depicted example, the processor 100 includes two clock domains, designated core clock domain 102 and L3 clock domain 103. The core clock domain 102 includes modules associated with operations of a processor core (not shown), and includes a Level 2 (L2) cache 120 to store data for access by the processor core. The L3 clock domain 103 includes a Level 3 (L3) cache to store data for access by the L2 cache 120, as described further herein.

In some embodiments the L3 cache 126 forms a memory hierarchy with the L2 cache 120 for the processor core of the core clock domain 102. The memory hierarchy also includes an L1 cache (not shown) for the processor core, and main memory (not shown). The processor 100 transfers data between different levels of the memory hierarchy based on a memory management scheme, thereby moving data likely to be accessed by the processor core closer to the processor core in the memory hierarchy and data less likely to be accessed by the processor core further away from the processor core in the memory hierarchy. In some embodiments, the processor 100 includes additional core clock domains (not shown) similar to core clock domain 102 to support different processor cores and corresponding L2 caches, with each core clock domain having its own memory hierarchy including its own L1 and L2 caches, but wherein multiple ones of the memory hierarchies of the processor 100 share the L3 cache 126.

To facilitate sharing of the L3 cache 126 while maintaining processing efficiency at the core clock domain 102, the processor 100 provides different clock signals to the core clock domain 102 and the L3 clock domain 103 to synchronize their respective operations. In the depicted example, the clock signal provided to the core clock domain 102 is designated "CCLK" and the clock signal provided to the L3 clock domain 103 is designated "L3CLK." As described further herein, the CCLK and L3CLK clock signals are asynchronous, and therefore may have different frequencies, but as described further herein have a phase relationship that is able to be tracked because the clock signals are derived from a common PLL source.

In particular, to generate the CCLK and L3CLK signals, the processor 100 employs a phase-locked loop (PLL) 105 and a clock generator 106. The PLL 105 is a voltage controlled oscillator circuit generally configured to generate a clock signal, designated "VCO_CLK", that is phase locked to a stable oscillating signal provided by a clock source (not shown), such as a reference crystal. In some embodiments, the PLL 105 supplies multiple clock signals that are out of phase with each other to support generation of clock signals at different frequencies by combining selected ones of the multiple clock signals. For example, in some embodiments the PLL 105 supplies eight clock signals that are each at least 45 degrees out of phase with one of the other eight clock signals, supporting $1/8^{th}$ integer frequency division steps for the generation of clock signals.

The clock generator 106 is a module configured to generate the CCLK and L3CLK signals based on the VCO_CLK signal. In some embodiments, as indicated above, the PLL 105 supplies multiple clock signals that are out of phase with each other, and the clock generator 106 generates the CCLK and L3CLK signals by selectively combining the multiple clock signals based on control signaling that independently establishes the clock frequency for each clock signal. In the depicted example, the control signaling is provided by two modules, designated dynamic voltage and frequency scaling (DVFS) module 107 and a voltage droop module 108.

The DVFS module 107 is generally configured to determine power modes for each of the core clock domain 102 and L3 clock domain 103 and to provide control signaling, represented at FIG. 1 as a signal designated "FREQ", indicating the frequency for each of the clock signals CCLK and L3CLK based on the respective power mode. In some embodiments, the DVFS module 107 indicates the frequency for each clock signal as a divisor value by which the frequency VCO_CLK clock signal, designated for purposes of description as "fvco", is to be divided. Thus, for example, the DVFS module 107 indicates the frequency of the CCLK signal as fvco divided by 2.5, and indicates the frequency of the L3CLK signal as fvco divided by 1.75. As illustrated by the example, the DVFS module 107 sets the frequencies for the CCLK and L3CLK clock signals independently, based on their respective power modes.

The voltage droop module 108 detects voltage droops for reference voltages at one or both of the core clock domain 102 and the clock domain 103 and, in response, provides control signaling, represented at FIG. 1 as a signal designated "DROOP", indicating an adjustment in the frequency of one or both of the clock signals CCLK and L3CLK. In response to detecting that a voltage droop has ceased (that is, that the reference voltage has returned to a nominal level), the voltage droop module 108 provides control signaling via the DROOP signal to terminate adjustment of one or both of the clock signals CCLK and L3CLK.

The clock generator 106 identifies the frequencies for each of the CCLK and L3CLK clock signals based on the DROOP and FREQ signals. In some embodiments, the clock generator 106 identifies the frequencies by identifying a nominal frequency for each clock signal indicated by the FREQ signal, and then adjusting the frequency for the clock signal based on the DROOP signal. For example, based on the FREQ signal the clock generator 106 determines the nominal clock frequency of the CCLK signal to be fvco divided by two. The clock generator 106 further determines that the DROOP signal indicates a voltage droop at the core clock domain 102. In response, the clock generator 106 adjusts the frequency for the CCLK signal to be fvco divided by two to ensure that the voltage droop does not cause improper operation of the processor core or other modules. In addition, based on the FREQ signal the clock generator 106 determines the nominal frequency of the L3 signal to be fvco divided by 1.75. The clock generator 106 further determines that the DROOP signal indicates no voltage droop at the L3 clock domain 103, and therefore maintains the frequency for the L3CLK signal at the nominal frequency.

The clock generator 106 generates the CCLK and L3 clock signals at their respective determined frequencies. In some embodiments, the clock generator 106 generates each of the CCLK and L3 clock signals by independently combining phase-shifted versions of the VCO_CLK signal to generate each clock signal at its respective frequency. As indicated above, the clock generator 106 sets and changes the frequency for each of the clock signals CCLK and L3CLK independently of the other, such that the CCLK and L3CLK clock signals are asynchronous.

Because of the asynchronicity of the clock signals CCLK and L3CLK, the core clock domain 102 and L3 clock domain 103 cannot reliably communicate data directly, based on only one of their corresponding clock signals. Accordingly, to facilitate communication of data between the core clock domain 102 and the L3 clock domain 103, the processor 100 includes a FIFO 130 having a plurality of entries, wherein each entry is a separately addressable storage location that is accessed by both the core clock domain 102 and the L3 clock domain 103. For example, in some embodiments the FIFO 130 includes three entries. For ease of description, it is assumed that the FIFO 130 is employed to transfer data from the core clock domain 102 to the L3 clock domain 103, and that the processor 100 includes a different FIFO (not shown) employed to transfer data from the L3 clock domain 103 to the core clock domain 102 according to the techniques described herein.

To access the FIFO 130, the core clock domain 102 and the L3 clock domain 103 each include a read/write module, designated read/write module 122 and read/write module 124, respectively. Each of the read/write modules 122 and 124 independently manages a set of pointers to access the FIFO 130. In particular, the read/write module 122 employs a write pointer to indicate the next entry of the FIFO 130 to be written. In response to receiving data from the L2 cache 120 for transfer to the L3 clock domain 103, the read/write module 122 writes the data to the entry of the FIFO 130, then adjusts the write pointer to point to the next entry of the FIFO 130. If the written entry is the last entry of the FIFO 130, the read/write module 122 adjusts the write pointer to point to the first entry of the FIFO 130. Thus, assuming the FIFO 130 has three entries, the write pointer first points to entry zero, then to entry one, then to entry two, and then returns to entry zero.

The read/write module 124 employs a read pointer to indicate the next entry of the FIFO 130 to be read. The read/write module 124 reads from the entry indicated by the read pointer, then adjusts the read pointer to point to the next entry of the FIFO 130. As with the write pointer described above, if the read entry is the last entry of the FIFO 130, the read/write module 124 adjusts the read pointer to point to the first entry of the FIFO 130.

Each of the read/write modules 122 and 124 are synchronized by the clock signal corresponding to their clock domain (that is, clock signals CCLK and L3CLK, respectively). As explained above, these clock signals are asynchronous. To ensure that written data has been properly stored at an entry of the FIFO 130 before it is read, the read/write module 124 tracks edges of the clock signal and maintains a minimum setup time for data written to an entry of the FIFO 130. In some embodiments where the clock signal for the read side (the clock domain where the data is being read) has a greater frequency, the read/write module 124 ensures that an entry of the FIFO 130 is not read for at least one clock cycle of the CCLK clock signal after the entry is written by the read/write module 122. In some embodiments where the clock signal for the write side (the clock domain where the data is being written to the FIFO 130) has a greater frequency, the read/write module 124 ensures that data is not written until the minimum setup time for data previously written has been reached. The read/write modules 122 and 124 thereby ensure that the data at an entry is not in transition (that is, being written) when it is read by the other read/write module. Further, the read/write modules 122 and 124 ensure that the minimum setup time is maintained in response to any frequency change in either the CCLK or the L3CLK clock signals, thereby ensuring proper data transfer in response to a clock frequency change without requiring re-transfer of data or reset of data transfer circuitry.

In some embodiments, the read/write module 124 does not track edges of the CCLK clock signal directly. Instead, as described further below with respect to FIG. 4, the read/write module 124 tracks edges of the CCLK signal indirectly by keeping track of elapsed phases between the L3CLK clock signal and the VCO_CLK clock signal, and by monitoring any indication of a change in frequency of either the CCLK or the L3CLK signal. By monitoring both the elapsed phases and the frequency of the clock signals, the read/write module 124 ensures that the minimum setup time is maintained. In particular, while the precise timing of edges of the CCLK clock signal may not be directly observable by the read/write module 124, monitoring of both the elapsed phases and frequency changes allows the read/write module 124 to enforce at least the minimum setup time, as described further below.

Figure 2:
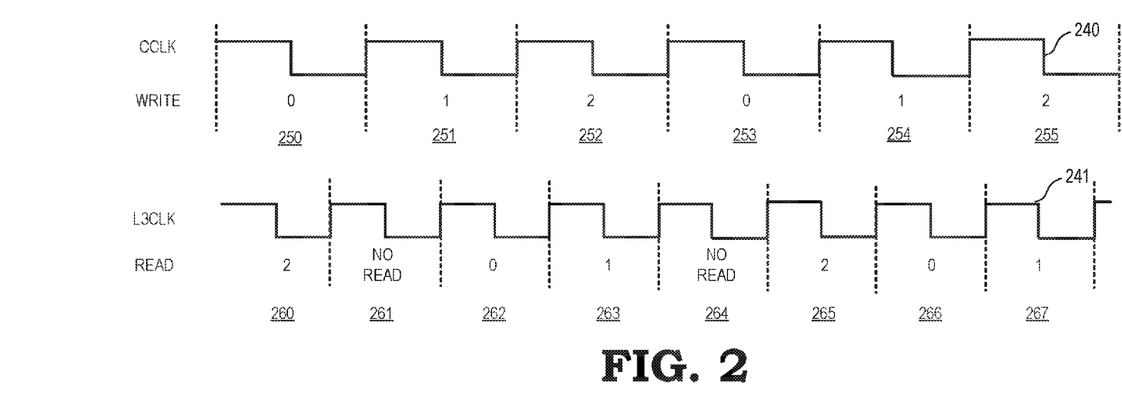
FIG. 2 is a diagram illustrating the FIFO read/write control module of FIG. 2 maintaining a minimum setup time for data transfer between clock domains of the processor of FIG. 1 in accordance with some embodiments.

FIG. 2 illustrates an example of the read/write module 124 maintaining a minimum setup time to read entries from the FIFO 130 in accordance with some embodiments. In particular, FIG. 2 illustrates waveforms 240 and 241, corresponding to examples of the CCLK and L3CLK signals respectively. The waveforms 240 and 241 are each divided into cycles: cycles 250-255 of CCLK (waveform 240) and cycles 260-267 of L3CLK (waveform 241). In addition, for each cycle 250-255 FIG. 2 indicates the location of the FIFO 130 that is written by the read/write module 122, and for each cycle 260-267, FIG. 2 illustrates the location of the FIFO 130 that is read by the read/write module 124. Thus, in the depicted example, the read/write module 122 writes location 0 of the FIFO 130 during cycle 250, and again during cycle 253, and the read/write module reads location 0 of the FIFO 130 during cycle 262 and again during cycle 266.

For the example of FIG. 2, it is assumed that each cycle of CCLK begins on a rising edge of the clock signal. Thus, the read/write module 122 initiates writing the corresponding location of the FIFO 130 in response to each rising edge of the clock signal CCLK. Similarly, each cycle of L3CLK begins on a rising edge of the clock signal, and therefore the read/write module 124, when it reads from the FIFO 130, initiates reading the corresponding location in response to a rising edge of the clock signal L3CLK. However, in order to ensure that the minimum setup time for writes to the FIFO 130 is maintained, the read/write module 124 does not read from the FIFO 130 during selected cycles, with such cycles designated "NO READ" at FIG. 2.

In the depicted example, the CCLK clock signal is at a slower frequency than the L3CLK clock signal, and therefore the read/write module 124 writes data to an entry of the FIFO 130 during each cycle of the CCLK clock signal. To maintain the minimum setup time of one CCLK cycle for each write, the read/write module 124 monitors edges of the CCLK clock signal and suppresses reads from the FIFO 130 for cycles of the L3 clock signal wherein the minimum setup time would not be satisfied. Thus, for cycle 261 of the L3CLK signal, the read/write module 124 is ready to read from location 0 of the FIFO 130. However, the read/write module 124 determines that at the start of cycle 261, a full cycle of CCLK has not elapsed since the read/write module 122 initiated writing to location 0 at the beginning of cycle 250. Accordingly, the read/write module 124 suppresses reading from the FIFO 130 during cycle 261 by, for example, not providing a read pointer to the FIFO 130 during the cycle. For cycle 262, the read/write module 124 determines that a full cycle of CCLK has elapsed since writing location 0 was initiated by the read/write module 122. In response, the read/write module 124 initiates reading location 0 at the beginning (that is, in response to the rising edge) of cycle 262.

For cycle 263, the read/write module 124 is ready to read from location 1 of FIFO 130. The read/write module 124 determines that a full cycle of CCLK has elapsed since location 1 was written during cycle 251, and therefore the read/write module 124 reads location 1 during cycle 263. For cycle 264, the read/write module 124 is ready to read from location 0 of the FIFO 130. However, the read/write module 124 determines that at the start of cycle 264, a full cycle of CCLK has not elapsed since the read/write module 122 initiated writing to location 2 at the beginning of cycle 252. Accordingly, the read/write module 124 suppresses reading from the FIFO 130 during cycle 264. For the following cycle 262, the read/write module 124 determines that a full cycle of CCLK has elapsed since writing location 2 was initiated by the read/write module 122. In response, the read/write module 124 initiates reading location 2 at the beginning (that is, in response to the rising edge) of cycle 264. Thus, in the example illustrated at FIG. 2, the read/write module 124 maintains the minimum setup time for data written to the FIFO 130 before the data is read, even when the CCLK and L3CLK signals are asynchronous.

It will be appreciated that FIG. 2 illustrates an example of the read/write module 124 reading from the FIFO 130. In some embodiments, the read/write module 124 writes to the FIFO 130 in similar fashion to maintain a minimum setup time for the written data. In particular, the read/write module 124 provides a write pointer to the FIFO 130 to write data during select cycles of the L3CLK signal, wherein the cycles are selected to ensure that data is not written to an entry until it has been read by read/write module 122 after the minimum setup time for data previously written to the entry has been achieved. Thus, for a given clock cycle wherein the read/write module is ready to write data to an entry, in response to determining that the minimum setup time for data written to an entry has not been achieved, the read/write module 124 suppresses provision of the write pointer to the FIFO 130 until the following clock cycle, thereby ensuring that the minimum setup time for written data is satisfied.

Figure 3:
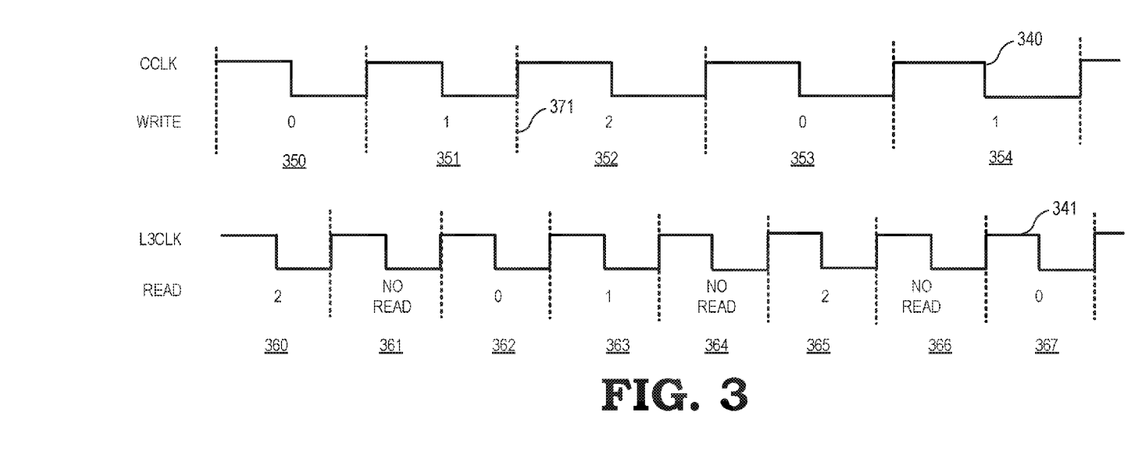
FIG. 3 is a diagram illustrating the FIFO read/write control module of FIG. 2 maintaining a minimum setup time in response to a frequency change at a clock domain of the processor of FIG. 1 in accordance with some embodiments.

In some embodiments, the read/write module 124 is configured to maintain the minimum setup time even when one or more of the CCLK and L3CLK signals undergoes a frequency change. An example in accordance with some embodiments is illustrated at FIG. 3. Similar to FIG. 2, FIG. 3 illustrates waveforms 340 and 341, corresponding to examples of the CCLK and L3CLK signals respectively. The waveforms 340 and 341 are each divided into cycles: cycles 350-354 of CCLK (waveform 340) and cycles 360-367 of L3CLK (waveform 241). For each cycle 350-354, FIG. 3 illustrates the location of the FIFO 130 that is written by the read/write module 122, and for each cycle 360-367 FIG. 3 illustrates the location of the FIFO 130 that is read by the read/write module 124.

Similar to the example of FIG. 2, in the example of FIG. 3 the read/write module 124 maintains a minimum setup time of one CCLK cycle for each write to the FIFO 130. However, in the example of FIG. 3, the CCLK signal changes frequency at time 371. The change in frequency may be the result of a change in power mode of the core clock domain 102, a voltage droop at the core clock domain 102 detected by the voltage droop module 108, or a combination thereof. In response to the frequency change, the read/write module 124 adjusts when the entries of the FIFO 130 are read to maintain the minimum setup time of one CCLK clock cycle. For example, for cycle 364 of the L3CLK, the read/write module 124 is ready to read from location 2 of the FIFO 130. However, the read/write module 124 determines that the minimum setup time for the data written to location 2 during cycle 352 of the CCLK clock signal has not been reached, because the cycle has been lengthened by the reduction in frequency of the CCLK clock signal at time 371. In response to determining that the minimum setup time has not been reached, the read/write module 124 suppresses reading from the FIFO 130 for cycle 364. At the following cycle 365, the read/write module 124 determines that the minimum setup time for writing data to location 2 has been reached under the adjusted frequency for the CCLK clock signal, and in response provides the read pointer to the FIFO 130 to read from location 2. Thus, by keeping track of the edges of the CCLK signal, the read/write module 124 adjusts when entries of the FIFO 130 are read to maintain the minimum setup time even when the frequency of the CCLK clock signal is changed.

Figure 4:
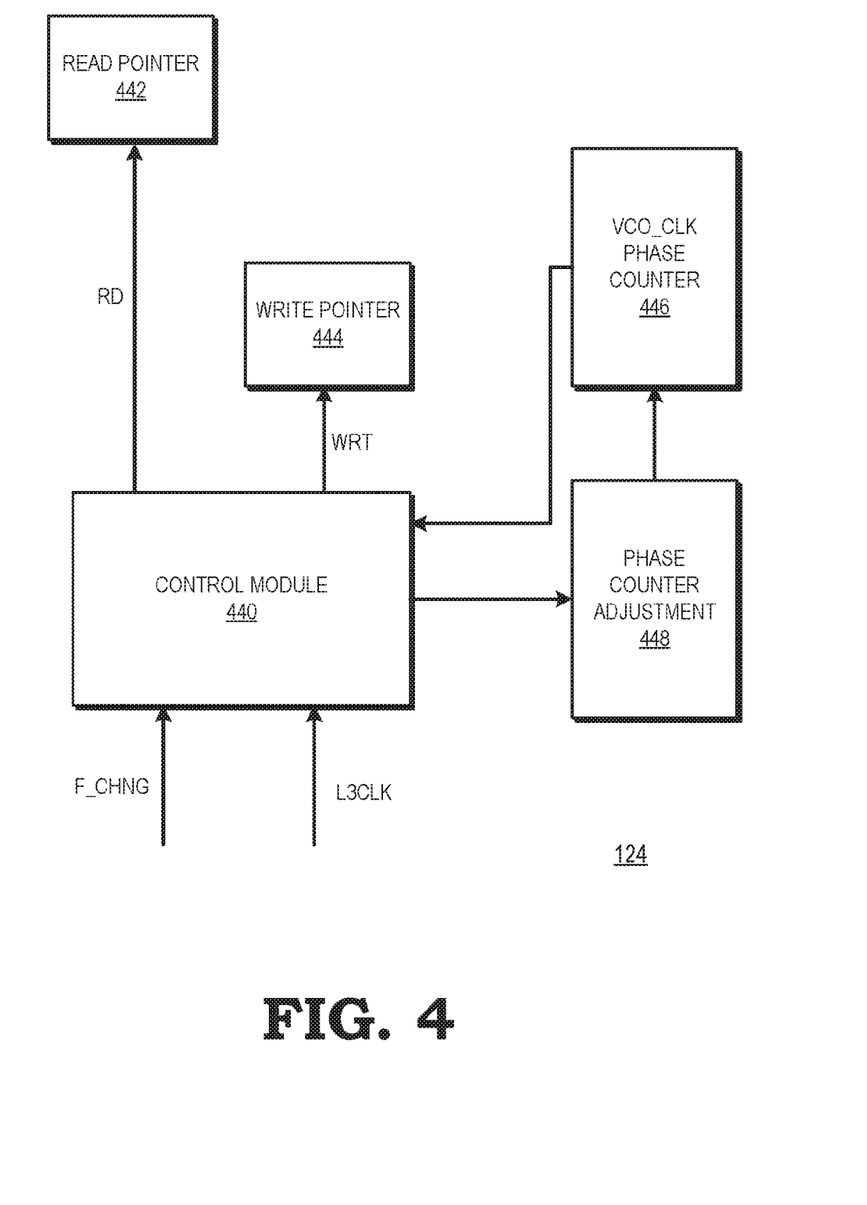
FIG. 4 is a block diagram of a first-in first-out (FIFO) read/write control module of the processor of FIG. 1 in accordance with some embodiments.

FIG. 4 illustrates a block diagram of the read/write module 124 in accordance with some embodiments. In the depicted example, and as described further below, the read/write module 124 tracks the edges of the CCLK clock signal by tracking elapsed phases of the VCO_CLK signal. In particular, because the CCLK clock signal is based on the VCO_CLK signal, the elapsed phases of the VCO_CLK signal provide a relative indication of the location in time of the edges of the CCLK clock signal. Accordingly, by tracking the elapsed phases of the VCO_CLK signal, the read/write module 124 is able to identify whether a minimum setup time for data written to the FIFO 130 has been achieved, without directly sensing the edges of the CCLK clock signal.

In the example of FIG. 4, the read/write module 124 includes a control module 440, a read pointer module 442, a write pointer module 444, a VCO_CLK phase counter 446, and a phase counter adjustment module 448. The read pointer module 442 is configured to store the read pointer for the read/write module 124. In response to assertion of a signal designated "RD", the read pointer module adjusts the read pointer to point to the next location of the FIFO 130 and provides the read pointer to the FIFO 130. In response, the FIFO 130 reads the location indicated by the read pointer and provides the read data to the read/write module 124 for transfer to the L3 cache 126.

The write pointer module 444 is configured similarly to the read pointer module 442 to write data to the FIFO 130. In particular, the write pointer module 444 stores data to be written to the FIFO 130 and the write pointer for the read/write module 124. In response to assertion of a signal designated "WRT", the read pointer module adjusts the write pointer to point to the next location of the FIFO 130 and provides the write pointer to the FIFO 130, along with the data to be written to the location. In response, the FIFO 130 writes the data location indicated by the write pointer.

The control module 440 is configured to generate the RD and WRT signals to read and write data from and to the FIFO 130 to maintain the minimum setup time as described above with respect to FIGS. 2 and 3. In particular, with respect to reading from the FIFO 130, the control module 440 identifies edges of the clock signal CCLK as described further herein, and asserts the RD signal in response to both a rising edge of the L3CLK signal and in response determining that the minimum setup time of at least one clock cycle of the CCLK has elapsed since the read/write module 122 wrote data to the next entry of the FIFO 130 to be read. If, in response to a rising edge of the L3CLK signal, the control module 440 determines that the minimum setup time of at least one clock signal has not elapsed since the read/write module 122 wrote data to the next entry of the FIFO 130 to be read, the control module 440 suppresses reading from the FIFO 130 by maintaining the RD signal in a negated state.

To monitor the edges of the CCLK signal, the control module 440 employs the VCO_CLK phase counter 446 and the phase counter adjustment module 448. The VCO_CLK phase counter 446 is a counter that counts down from a predefined value to zero, then resets itself to the predefined value. To count down from the predefined value, in response to each rising edge of the L3CLK signal, the VCO-CLK phase counter decrements its stored value by an adjustment amount stored by the phase counter adjustment module 448. The adjustment value reflects the number of phases of the VCO_CLK signal for each phase of the CCLK signal. The control module 440 sets the adjustment amount based on the frequency of the CCLK clock signal. In particular, in response to a change in the frequency of the CCLK clock signal, the clock generator 106 (FIG. 1) provides an indication of the change via the F_CHNG signal. In response, the control module 440 adjusts the adjustment value at the phase counter adjustment module 448 to reflect the new number of phases of the VCO_CLK signal for each phase of the CCLK signal at the new frequency.

When the VCO_CLK phase counter 446 reaches zero, it asserts a signal to the control module 440. Because assertion of the signal is based on the relationship of the VCO_CLK signal phases to the CCLK clock signal, assertion of the signal indicates to the control module 440 the relative position of the edges of the CCLK clock signal with respect to the L3CLK signal. Accordingly, based on the assertion of the signal by the VCO_CLK phase counter 446, the control module 440 determines whether the minimum setup time has been reached after the read/write module 122 has written data to an entry of the FIFO 130. Further, because the phase counter adjustment module 448 is updated based on changes in the frequency of the CCLK signal, the control module 440 maintains the minimum setup time in response to such frequency changes. In some embodiments, the read/write module 124 tracks phases of the CCLK signal using a counter and adjustment value similar to the counter 446 and adjustment module 448, but with an adjustment value that reflects the phase and frequency relationship between the CCLK and L3CLK signals. This allows the control module 440 to identify, for each read and write to the FIFO 130, whether the minimum setup time for the corresponding memory access operation has been achieved, and therefore whether the location of the FIFO 130 is able to be accessed.

Figure 5:
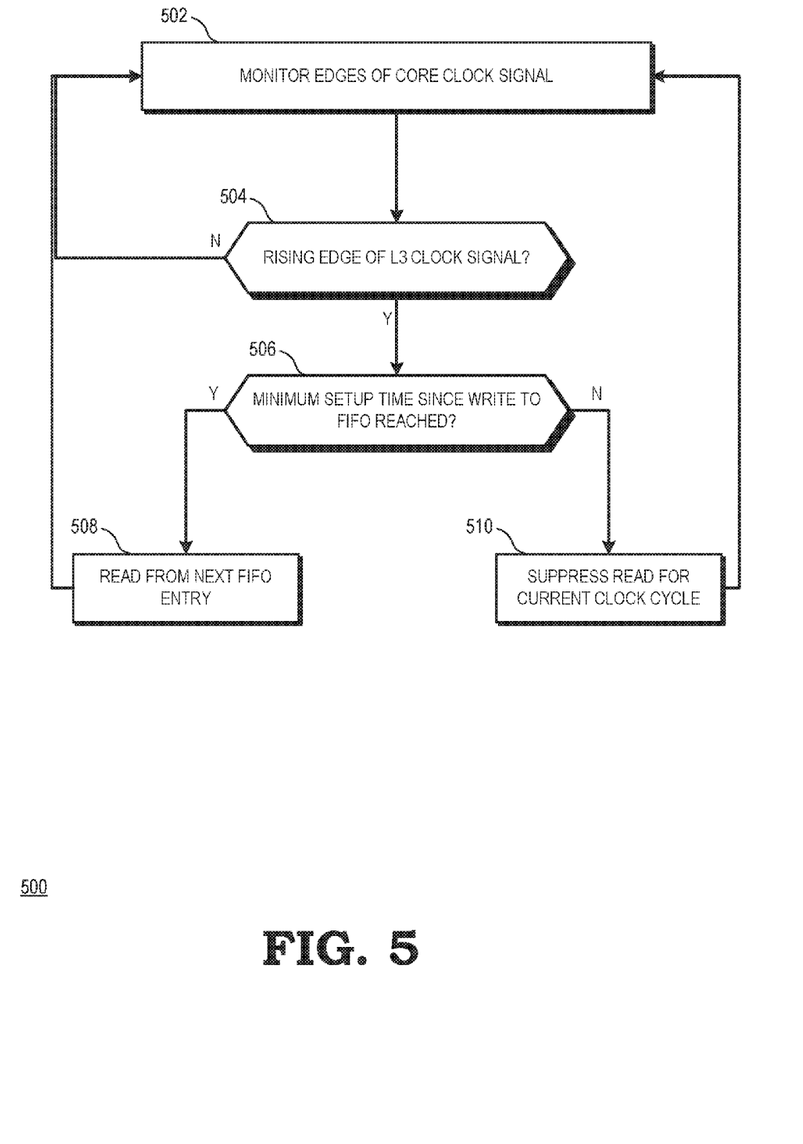
FIG. 5 is a flow diagram of a method of maintaining a minimum setup time for transferring data between clock domains of a processor in response to a frequency change of a clock signal for one of the clock domains in accordance with some embodiments.

FIG. 5 illustrates a flow diagram of a method 500 of maintaining a minimum setup time for reading data from a FIFO between processor clock domains in accordance with some embodiments. For purposes of description, the method 500 is described with respect to an example implementation at the processor 100 of FIG. 1. At block 502 the read/write module 124 at the L3 clock domain 103 monitors the edges of the clock signal CCLK of the core clock domain 102. At block 504 the read/write module identifies whether it has received the next rising edge of the L3CLK clock signal. If not, the method returns to block 502.

Returning to block 504, in response to receiving a rising edge of the L3CLK clock signal, the method flow proceeds to block 506 and the read/write module 124 determines, based on the monitored edges of the CCLK signal, whether the minimum setup time has been reached for data written to the next entry of the FIFO 130 that is to be read. If so, the method flow proceeds to block 508 and the read/write module 124 issues a read pointer to read the next entry of the FIFO 130, and provides the read data to the L3 cache 126. The method flow returns to block 502. Returning to block 506, if the minimum setup time has not been reached, the method flow proceeds to block 510 and the read/write module 124 suppresses reading the FIFO 130 by not issuing a read pointer for the present cycle of the L3CLK clock signal.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   at a first clock domain of a processor, accessing a first entry of a buffer based on a first edge of a first clock signal;
   at a second clock domain of the processor:
      selecting a second edge of a second clock signal based on a minimum setup time to read from the first entry of the buffer, the second clock signal asynchronous with the first clock signal;
      accessing the first entry of the buffer in response to the selected second edge;
      in response to a request for a first frequency change to the first clock signal, selecting a third edge of the second clock signal to maintain the minimum setup time; and
      accessing the buffer in response to the selected second edge.

2. The method of claim 1, further comprising:
   in response to a request for a second frequency change to the second clock signal, selecting a fourth edge of the second clock signal to maintain the minimum setup time; and
   accessing the buffer in response to the selected second edge.

3. The method of claim 1, wherein:
   selecting the second edge comprises selecting the second edge based on expiration of a first number of phases of the second clock signal after a first previous access of the buffer at the second clock domain; and
   selecting the third edge comprises selecting the third edge based on expiration of a second number phases of the second clock signal after a second previous access of the buffer at the second clock domain.

4. The method of claim 1, wherein the first clock signal is at a first clock frequency and the second clock signal is at a second clock frequency different from the first clock frequency.

5. The method of claim 1, further comprising:
requesting the first frequency change in response to detecting a voltage droop at the processor.

6. The method of claim 1, further comprising:
requesting the first frequency change in response to a change in a power mode of the processor.

7. The method of claim 1, wherein selecting the second edge comprises:
counting a first number of phases of a third clock signal based on a first adjustment value; and
selecting the second edge based on the first number of phases.

8. The method of claim 7, wherein selecting the third edge comprises:
counting a second number of phases of the third clock signal based on a second adjustment value, the second adjustment value different from the first adjustment value; and
selecting the third edge based on the second adjustment value.

9. The method of claim 8, further comprising:
changing from the first adjustment value to the second adjustment value in response to the request for the first frequency change.

10. The method of claim 8, further comprising generating the first clock signal and the second clock signal based on the third clock signal.

11. A processor comprising:
a first-in first-out buffer (FIFO);
a first clock domain at the FIFO based on a first edge of a first clock signal;
a second clock domain comprising a read module configured to:
select a second edge of a second clock signal based on a minimum setup time to access the first entry of the FIFO, the second clock signal asynchronous with the first clock signal;
access a first entry of the FIFO in response to the selected second edge;
in response to a request for a first frequency change to the first clock signal, select a third edge of the second clock signal to maintain the minimum setup time; and
access the FIFO in response to the selected second edge.

12. The processor of claim 11, wherein the read module is configured to:
in response to a request for a second frequency change to the second clock signal, select a fourth edge of the second clock signal to maintain the minimum setup time; and
access the FIFO in response to the selected second edge.

13. The processor of claim 11, wherein:
selecting the second edge comprises selecting the second edge based on expiration of a first number of phases of the second clock signal after a first previous access of the FIFO at the second clock domain; and
selecting the third edge comprises selecting the third edge based on expiration of a second number phases of the second clock signal after a second previous access of the FIFO at the second clock domain.

14. The processor of claim 11, wherein the first clock signal is at a first clock frequency and the second clock signal is at a second clock frequency different from the first clock frequency.

15. The processor of claim 11, further comprising:
a voltage droop module to request the first frequency change in response to detecting a voltage droop at the processor.

16. The processor of claim 11, further comprising:
a power control module configured to request the first frequency change in response to a change in a power mode of the processor.

17. The processor of claim 11, wherein the read module is configured to select the second edge by:
counting a first number of phases of a third clock signal based on a first adjustment value; and
selecting the second edge based on the first number of phases.

18. The processor of claim 17, wherein the read module is configured to select the third edge by:
counting a second number of phases of the third clock signal based on a second adjustment value, the second adjustment value different from the first adjustment value; and
selecting the third edge based on the second adjustment value.

19. The processor of claim 18, wherein the read module is configured to:
change from the first adjustment value to the second adjustment value in response to the request for the first frequency change.

* * * * *

UNITED STATES PATENT AND TRADEMARK OFFICE
CERTIFICATE OF CORRECTION

PATENT NO. : 10,168,731 B2
APPLICATION NO. : 15/209521
DATED : January 1, 2019
INVENTOR(S) : Steven Kommrusch et al.

Page 1 of 1

It is certified that error appears in the above-identified patent and that said Letters Patent is hereby corrected as shown below:

In the Claims

At Column 10, Claim 1, Line 49, please delete "to the selected second" and substitute --to the selected third--

Signed and Sealed this
Tenth Day of March, 2020

Andrei Iancu
*Director of the United States Patent and Trademark Office*